United States Patent [19]

Gelardi et al.

[11] Patent Number: 4,662,579

[45] Date of Patent: May 5, 1987

[54] COINED REEL LEAF SPRING FOR A VIDEO TAPE CASSETTE

[75] Inventors: Paul J. Gelardi, Cape Porpoise, Me.; Terry D. Lindberg, Stillwater, Minn.; Connie M. Snyder, Saco, Me.

[73] Assignee: Shape Inc., Biddeford, Me.

[21] Appl. No.: 766,424

[22] Filed: Aug. 16, 1985

[51] Int. Cl.$^4$ ............... G11B 23/087; F16F 1/18
[52] U.S. Cl. ................ 242/199; 242/194; 242/197; 242/198; 267/47; 267/158; 267/163; 360/132
[58] Field of Search ............ 242/194, 197–200; 267/47, 48, 158, 160, 163, 181; 360/92, 93, 96.1, 96.5, 132, 134

[56] References Cited

U.S. PATENT DOCUMENTS

| | | | |
|---|---|---|---|
| 2,820,625 | 1/1958 | Davis | 267/158 |
| 3,425,282 | 2/1969 | Entin | 267/163 X |
| 3,804,351 | 4/1974 | Kaneko et al. | 242/199 |
| 4,368,860 | 1/1983 | Goto | 242/199 |
| 4,376,545 | 3/1983 | Sandorf | 267/158 X |
| 4,428,547 | 1/1984 | Gotoh | 242/199 |
| 4,428,548 | 1/1984 | Gotoh | 242/199 |
| 4,449,676 | 5/1984 | Ogata et al. | 242/198 |
| 4,452,407 | 6/1984 | Ogata et al. | 242/198 |
| 4,484,248 | 11/1984 | Ogiro et al. | 360/132 |
| 4,485,989 | 12/1984 | Ogiro et al. | 242/198 |
| 4,496,118 | 1/1985 | Oishi et al. | 242/198 |
| 4,500,050 | 2/1985 | Oishi et al. | 242/198 |
| 4,504,028 | 3/1985 | Goto | 242/198 |
| 4,546,936 | 10/1985 | Okamura et al. | 242/198 |
| 4,546,958 | 10/1985 | Ohno et al. | 267/47 |
| 4,593,868 | 6/1986 | Sato et al. | 242/199 |

Primary Examiner—John Petrakes
Attorney, Agent, or Firm—Staas & Halsey

[57] ABSTRACT

An improved coined reel leaf spring for a video tape cassette is provided having a central portion and arms emanating therefrom. The arms include at least one rib formed therein adding strength to the arms and allowing a one-half reduction in the conventional thickness of the coined reel leaf spring required to effect bending and biasing. The reduced thickness, of course, reduces material costs for the coined reel leaf spring and overall production costs for the tape cassette.

24 Claims, 8 Drawing Figures

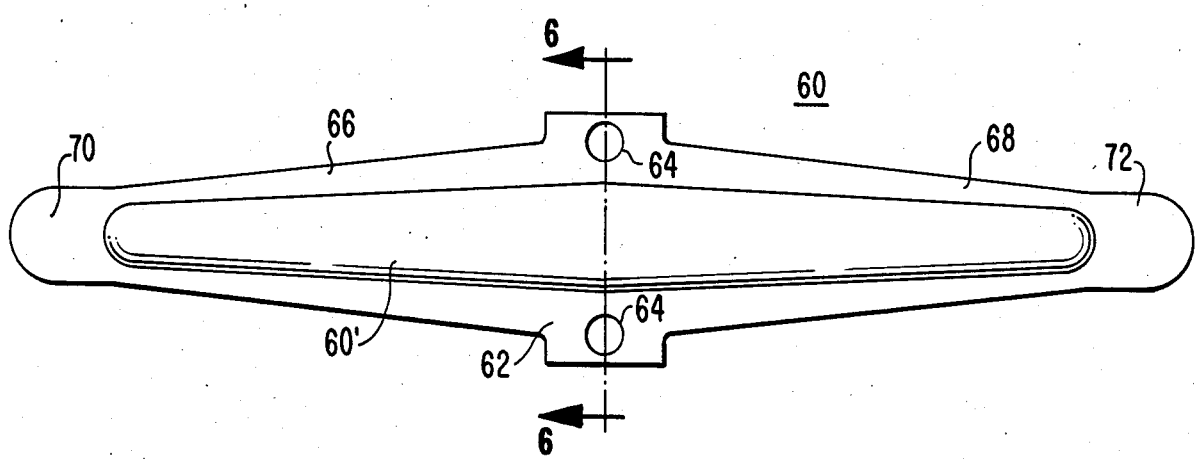
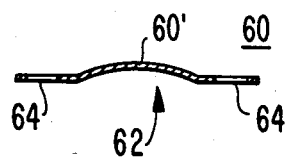
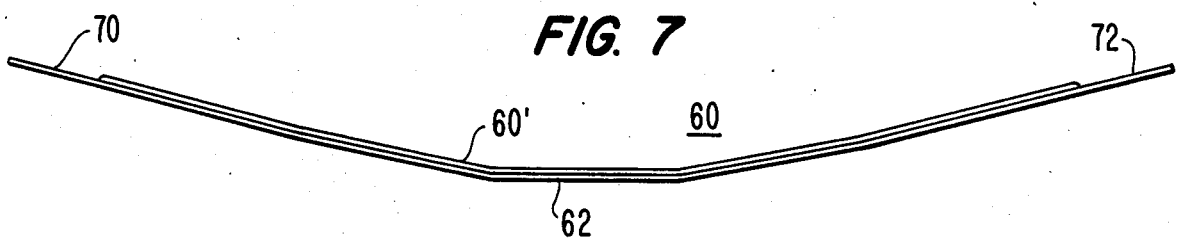
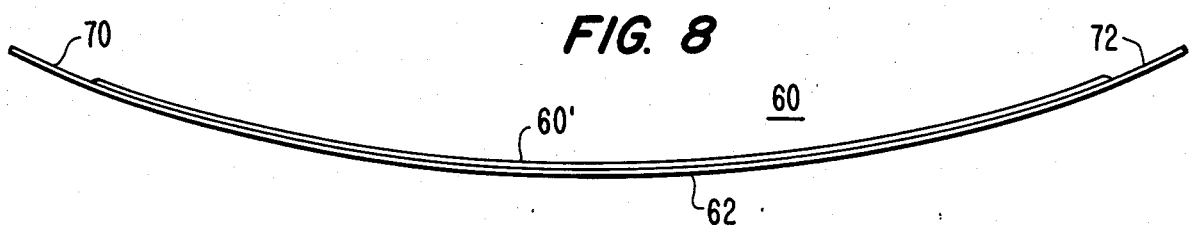

COINED REEL LEAF SPRING FOR A VIDEO TAPE CASSETTE

BACKGROUND OF THE INVENTION

This invention relates to a tape cassette and, more particularly, to a reel leaf spring attached to the underside of a tape cassette cover for rotatably supporting the hubs of the tape reels mounted on the tape cassette base.

Conventionally, as described in U.S. Pat. No. 4,368,860, a video tape cassette includes, among other things, a "coined" reel leaf spring, i.e., a spring stamped from a flat piece of stainless steel, such that arms are formed to extend from both sides of a central, flat portion. The reel leaf spring is fixed to the underside of the tape cassette cover at the central flat portion via holes formed therein which receive corresponding projections formed on the center of the cover which are then caulked or swedged. The arms extending from the central flat portion are preliminarily bent at an angle, such as 5°-30°. In this way, the arms of the reel leaf spring protrude downward, away from the underside of the cover.

With the arrangement described above, when the cover, including the reel leaf spring, is assembled with the tape cassette base in a known manner, both of the free ends of the arms of the reel leaf spring contact the hubs of the respective tape reels and bias the tape reels downwardly, so that the tape reels are rotatably retained in position.

The conventional coined reel leaf spring described above necessarily requires a thickness of approximately 0.012 of an inch to effect the required bending and to maintain the biased relationship against the hubs throughout the useful life of the video tape cassette.

A major drawback of this conventional leaf spring is that the required thickness of the metal used to make the reel leaf spring results in a relatively high material cost, thus making overall production costs for the tape cassette high. Accordingly, the prior art discussed above still does not teach a coined reel leaf spring which is capable of producing the most cost-efficient video tape cassette.

SUMMARY OF THE INVENTION

Accordingly, it is an object of the present invention to provide a coined reel leaf spring for a video tape cassette using about one-half of the usual amount of metal, thereby reducing overall production costs of the tape cassette.

It is another object of the present invention to provide a coined reel leaf spring for a video tape cassette which is less costly to produce, but which biases the tape reels with equal or superior effect to that of the prior art.

To achieve the foregoing and other objects of the present invention and in accordance with the purposes of the invention, there is provided an improved coined reel leaf spring having a central portion from which arms emanate, each arm including a strengthening member, such as a rib, formed therein. This design reinforces each arm and allows a reduction in the required thickness of the coined reel leaf spring needed to effect bending and biasing from the conventional thickness of 0.012 of an inch to 0.006 or 0.008 of an inch. The reduced thickness, of course, reduces material costs for the coined reel leaf spring and overall production costs for the tape cassette. The expected savings is about one cent per tape cassette produced, which on a mass-produced level, amounts to a significant savings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a top plan view of an alternate embodiment of the coined reel leaf spring according to the present invention;

FIG. 6 is a front, cross-sectional view of the coined reel leaf spring shown in FIG. 5, taken along line 6—6;

FIG. 7 is a side view showing one way of bending the coined reel leaf spring shown in FIG. 5; and FIG. 8 is a side view of an alternate way of bending the coined reel leaf spring shown in FIG. 5.

DETAILED DESCRIPTION OF THE PREFERRED EMBODIMENTS

The preferred embodiment of the coined reel leaf spring for a video tape cassette according to the present invention will now be described with reference to FIGS. 1-4.

Figure 1:
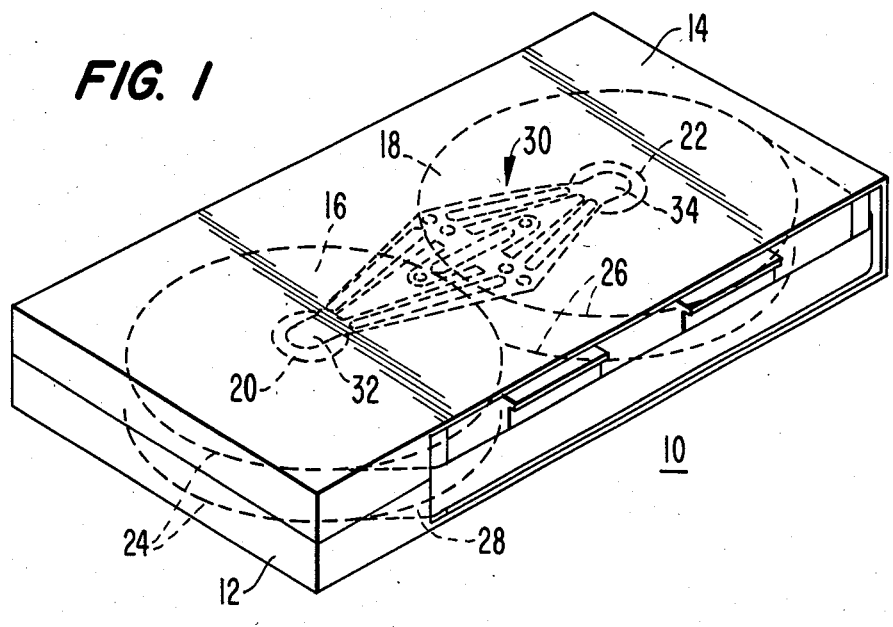
FIG. 1 is a perspective view of a tape cassette according to the present invention, illustrating particularly orientation of the preferred embodiment of the coined reel leaf spring.

FIG. 1 illustrates a video tape cassette according to the present invention, the cassette being indicated generally by reference numeral 10. The tape cassette 10 comprises a base 12 and a cover 14, each made of a plastic resin. The assembled base 12 and cover 14 accommodate a pair of tape reels 16 and 18 in a known manner. Each of the tape reels 16 and 18 comprises a hub 20 and 22, respectively, for winding magnetic recording tape 28 therearound. The tape reels 16 and 18 also include a pair of flanges 24 and 26, respectively, fixed co-axially to the hubs 20 and 22 on the top and bottom ends thereof for protection of the upper and lower edges of the magnetic recording tape 28.

The attachment of the coined leaf spring 30 to the tape cassette 10, is as follows. As shown in FIG. 1, the coined reel leaf spring 30 is connected to the underside of the cover 14 so that both free ends 32 and 34 thereof protrude downward, away from the cover 14. When the cover 14 is assembled with the base 12, the free ends 32 and 34 contact the corresponding hubs 20 and 22 and bias the tape reels 16 and 18 downwardly, so that the tape reels 16 and 18 are rotatably retained in position.

Figure 2:
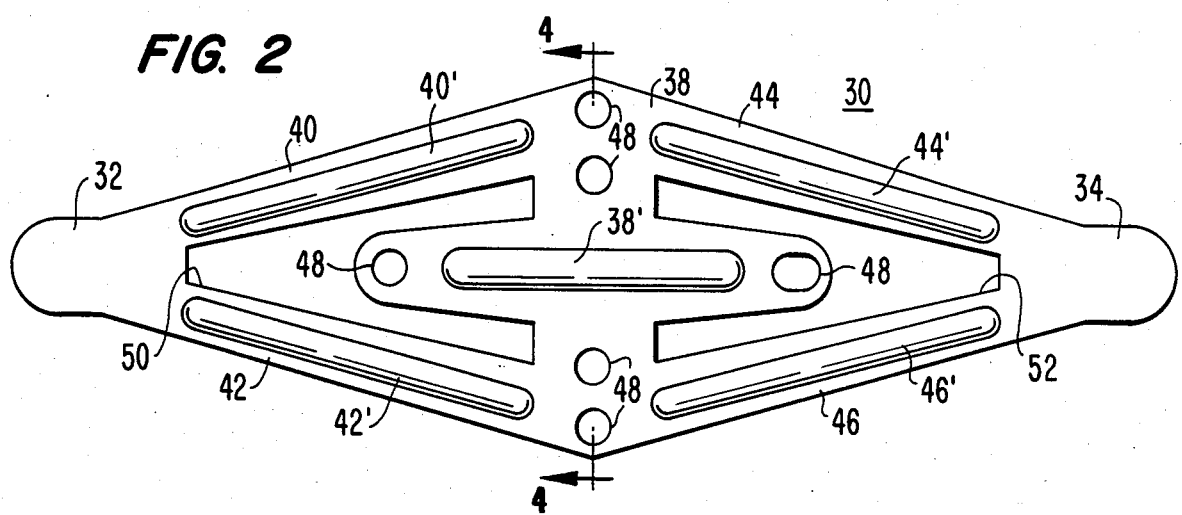
FIG. 2 is a top plan view of the coined reel leaf spring shown in FIG. 1.

FIG. 2 is a top plan view of the preferred embodiment of the coined reel leaf spring 30 shown in FIG. 1. In this embodiment, the coined reel leaf spring 30 is formed of stainless steel about 0.006 to 0.008 of an inch thick with strengthening means such as ribs, projections, or contours 38', 40', 42', 44' and 46' formed therein to achieve the required bending and biasing described above.

More particularly, as can be seen in FIG. 2, the coined reel leaf spring 30 basically comprises a diamond shaped member having a central portion 38 from which emanate first and second arms, 40 and 42, respectively, converging to the free end 32 and third and fourth arms 44 and 46 converging to the free end 34. In each of the arms 40, 42, 44 and 46, there is formed a rib 40', 42', 44' and 46', respectively. Further, between the arms 40 and 42, and between the arms 44 and 46, there are located corresponding left and right cut-out portions 50 and 52, respectively.

In the central portion 38 there is also formed a strengthening means, such as a rib 38'. Further, in the central portion there is formed a plurality of holes 48 which are used for attaching the coined reel leaf spring 30 to the cover 14 of the tape cassette 10, as described above.

Figure 3:
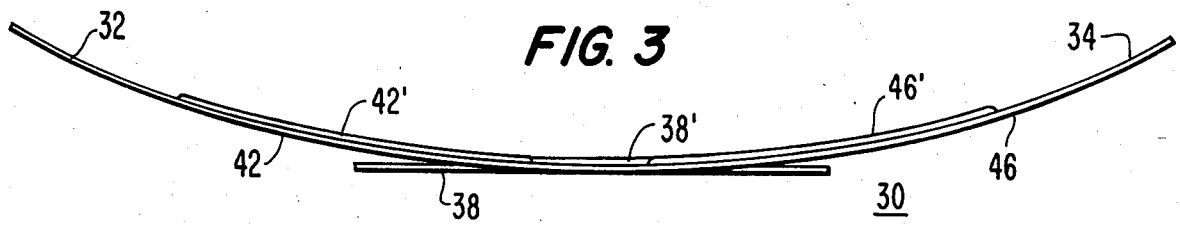
FIG. 3 is a side view of the coined reel leaf spring shown in FIG. 2.

FIG. 3 is a side view of the reel leaf spring 30 shown in FIG. 2. As can be seen in FIG. 3, the arms 40, 42, 44 and 46 are bent in the direction away from the central portion 38 (which remains flat) to provide the bias required by the free ends 32 and 34 to resiliently abut the tape reel hubs 20 and 22. The ribs 40', 42', 44' and 46' bend with the arms 40, 42, 44 and 46 and, along with projection 38', provide the added strength which allows the coined reel leaf spring 30 to be made of thinner stainless steel, e.g., 0.006 to 0.008 of an inch. The thickness of the present invention represents about one-half of the conventional thickness.

Figure 4:
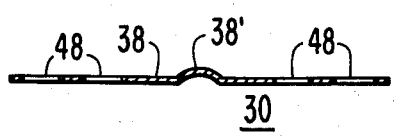
FIG. 4 is a front, cross-sectional view of the coined reel leaf spring shown in FIG. 2, taken along line 4—4.

FIG. 4 is a front, cross-sectional view of the reel leaf spring 30 shown in FIG. 3. FIG. 4 illustrates specifically the central portion 38, the rib 38' formed therein, and the holes 48 for attaching the spring to the cover 14 of the tape cassette 10.

The alternate embodiment of the coined reel leaf spring according to the present invention is shown in FIGS. 5-8 and will now be described.

As can be seen in FIG. 5, the alternate embodiment of the coined leaf spring is indicated generally by reference numeral 60 and includes a central portion 62 having a pair of holes 64 formed therein for attachment purposes to the cover 14 of the tape cassette 10, as described above. Extending from the central portion 62 are colinear arms 66 and 68, which extend to free ends 70 and 72, respectively. Formed substantially along the central length of the coined reel leaf spring 60 is a strengthening means, such as a rib 60'. Again, it is this strengthening rib 60' which allows the coined reel leaf spring 60 to accurately bend and bias the hubs 20 and 22, even though the metal making up the reel leaf spring 60 is thinner than conventional.

FIG. 6 is a front, cross-sectional view of the reel leaf spring 60, illustrating specifically the central portion 62 having the rib 60' and the holes 64 formed therein.

FIG. 7 is a side view of the reel leaf spring shown in FIGS. 5 and 6. FIG. 7 illustrates one way of bending the coined reel leaf spring 60 so that it provides proper biasing for the tape reel hubs 20 and 22. More particularly, the coined reel leaf spring 60 is bent such that the central portion 62 remains flat but the colinear arms 66 and 68 are curved at the traditional angle relative to the plane of the flat, central portion 62.

FIG. 8 is a side view of an alternate way of bending the coined reel leaf spring 60 shown in FIGS. 5 and 6. In this embodiment the central portion remains flat but the colinear arms are curved or bowed so that the free ends 70 and 72 are each at the traditional angle relative to the middle of the coined reel leaf spring 60.

The foregoing is considered illustrative only of the principles of the present invention. Further, since numerous modifications and changes will readily occur to those skilled in the art, it is not desired to limit the invention to the exact construction and operation shown and described. For example, the above-described tape cassette has been shown to be of the type intended for use in video tape players/recorders. However, the invention can be similarly applied to tape cassettes for use in audio or other playing/recording apparatus. In addition, although specific combinations of arms and corresponding strengthening means are discussed above, it should be understood that the present invention contemplates other combinations, such as several ribs being formed in each arm. Accordingly, all suitable modifications and equivalents may be resorted to, falling within the scope of the invention and the appended claims and their equivalents.

We claim:

1. A coined, metal reel leaf spring of a single, uniform thickness to bias against tape reel hubs of a tape cassette, comprising:
   (a) a central portion; and
   (b) a plurality of arms emanating from the central portion, each arm including a projecting portion for strengthening the arm and for minimizing the thickness of the metal required to create bias, and each arm and projecting portion being bent relative to the central portion.

2. The coined reel leaf spring according to claim 1, wherein the projecting portion comprises one rib formed in each arm.

3. The coined reel leaf spring according to claim 2, wherein the plurality of arms comprises two opposing sets of converging arms extending from the central portion.

4. The coined reel leaf spring according to claim 3, wherein the central portion is flat and each of the plurality of arms is oriented at an angle relative to the central portion.

5. The coined reel leaf spring according to claim 4, wherein the shape thereof is substantially a diamond.

6. The coined reel leaf spring according to claim 5, wherein the central portion comprises a second projecting portion.

7. The coined reel leaf spring according to claim 6, wherein the second projecting portion comprises a rib formed in the central portion.

8. The coined reel leaf spring according to claim 1, wherein the projecting portion comprises one rib formed in the plurality of arms.

9. The coined reel leaf spring according to claim 8, wherein the plurality of arms comprises two opposing arms emanating from the central portion in a colinear manner.

10. The coined reel leaf spring according to claim 9, wherein the central portion is flat and the two arms form a continuous curve.

11. The coined reel leaf spring according to claim 1, wherein the single thickness of the metal is 0.006 to 0.008 of an inch.

12. The coined reel leaf spring according to claim 11, wherein the central portion also comprises the one rib formed in the colinear arms.

13. A video tape cassette, comprising:
   (a) a base and a cover, the base being assembled with the cover to define a tape reel receiving area therebetween;

(b) a pair of tape reels mounted in the tape reel receiving area of the base, each of the tape reels including a hub having video tape wound thereon; and (c) a coined, metal reel leaf spring of a single, uniform thickness to bias against the tape reel hubs, having
   (i) a central portion, and
   (ii) a plurality of arms emanating from the central portion, each arm including a projecting portion for strengthening the arm and for minimizing the thickness of the metal required to create bias, and each arm and projecting portion being bent relative to the central portion.

14. The video tape cassette according to claim 13, wherein the projecting portion comprises one rib formed in each arm.

15. The video tape cassette according to claim 14, wherein the plurality of arms comprises two opposing sets of converging arms extending from the central portion.

16. The video tape cassette according to claim 15, wherein the central portion is flat and each of the plurality of arms is oriented at an angle relative to the central portion.

17. The video tape cassette according to claim 16, wherein the shape thereof is substantially a diamond.

18. The video tape cassette according to claim 17, wherein the central portion comprises a second projecting portion.

19. The video tape cassette according to claim 18, wherein the second projecting portion comprises a rib formed in the central portion.

20. The video tape cassette according to claim 13, wherein the projecting portion comprises one rib formed in the plurality of arms.

21. The video tape cassette according to claim 20, wherein the plurality of arms comprises two opposing arms extending from the central portion in a colinear manner.

22. The video tape cassette according to claim 21, wherein the central portion is flat and each of the two arms form a continuous curve.

23. The video tape cassette according to claim 22, wherein the central portion also comprises the one rib formed in the colinear arms.

24. The video tape cassette according to claim 13, wherein the single thickness of the metal is 0.006 to 0.008 of an inch.

* * * * *